United States Patent
Beining

(10) Patent No.: US 9,643,550 B2
(45) Date of Patent: May 9, 2017

(54) HOSE VOLTAGE CARRIER

(71) Applicant: Eaton Corporation, Cleveland, OH (US)

(72) Inventor: Michael Paul Beining, Monclova, OH (US)

(73) Assignee: Eaton Corporation, Cleveland, OH (US)

( * ) Notice: Subject to any disclaimer, the term of this patent is extended or adjusted under 35 U.S.C. 154(b) by 382 days.

(21) Appl. No.: 14/213,775

(22) Filed: Mar. 14, 2014

(65) Prior Publication Data

US 2014/0265561 A1    Sep. 18, 2014

Related U.S. Application Data

(60) Provisional application No. 61/793,246, filed on Mar. 15, 2013.

(51) Int. Cl.
| | |
|---|---|
| *B60R 16/03* | (2006.01) |
| *F16L 11/127* | (2006.01) |
| *F16L 11/08* | (2006.01) |
| *G01R 31/00* | (2006.01) |
| *E02F 9/22* | (2006.01) |

(52) U.S. Cl.
CPC ............ *B60R 16/03* (2013.01); *F16L 11/082* (2013.01); *F16L 11/086* (2013.01); *F16L 11/127* (2013.01); *E02F 9/2275* (2013.01)

(58) Field of Classification Search
CPC .............................. G01R 31/00; H04B 17/309
USPC ........................................................ 307/147
See application file for complete search history.

(56) References Cited

U.S. PATENT DOCUMENTS

| | | | |
|---|---|---|---|
| 2,291,070 A | | 7/1942 | Bruno |
| 2,436,949 A | | 3/1948 | Anderson |
| 4,029,889 A | | 6/1977 | Mizuochi |
| 4,229,613 A | * | 10/1980 | Braun ................ B29D 23/001 |
| | | | 138/103 |

(Continued)

FOREIGN PATENT DOCUMENTS

| | | |
|---|---|---|
| DE | 31 40 804 A1 | 4/1983 |
| DE | 40 30 788 A1 | 8/1991 |

(Continued)

OTHER PUBLICATIONS

International Search Report and Written Opinion for Application No. PCT/US2011/061865 mailed May 21, 2012.

(Continued)

*Primary Examiner* — Robert Deberadinis
(74) *Attorney, Agent, or Firm* — Merchant & Gould P.C.

(57) ABSTRACT

Methods and systems for delivering a voltage signal to remote equipment associated with a hydraulic system are disclosed. One method includes actuating an output voltage from a control panel at an electronic control output electrically connected at a socket positioned on a first end of a hose assembly, the hose assembly having a conductive layer electrically connected to the socket and extending the length of the hose assembly and also electrically connected to a second socket at a second end of the hose assembly. By actuating the output voltage, the output voltage is delivered to remote equipment at the second end of the hose assembly that is electrically connected to the second socket.

18 Claims, 5 Drawing Sheets

(56) References Cited

U.S. PATENT DOCUMENTS

| | | | |
|---|---|---|---|
| 4,446,892 A | | 5/1984 | Maxwell |
| 5,159,200 A | | 10/1992 | Dunbar et al. |
| 5,267,670 A | | 12/1993 | Foster |
| 5,343,738 A | | 9/1994 | Skaggs |
| 5,387,899 A | | 2/1995 | DiLauro et al. |
| 5,442,810 A | * | 8/1995 | Jenquin .................. G08G 1/127 174/47 |
| 5,551,484 A | | 9/1996 | Charboneau |
| 5,634,497 A | | 6/1997 | Neto |
| 5,671,689 A | | 9/1997 | Clapp et al. |
| 5,969,618 A | | 10/1999 | Redmond |
| 5,992,218 A | | 11/1999 | Tryba et al. |
| 6,384,611 B1 | | 5/2002 | Wallace et al. |
| 6,386,237 B1 | | 5/2002 | Chevalier et al. |
| 6,498,991 B1 | | 12/2002 | Phelan et al. |
| 6,735,705 B1 | | 5/2004 | Egbert et al. |
| 6,958,615 B2 | | 10/2005 | Poulbot et al. |
| 7,555,936 B2 | | 7/2009 | Deckard |
| 8,087,430 B1 | | 1/2012 | Betz et al. |
| 8,183,872 B2 | | 5/2012 | Stark |
| 8,217,669 B1 | | 7/2012 | Watkins, Jr. |
| 8,515,687 B2 | | 8/2013 | Pereira et al. |
| 8,829,929 B1 | | 9/2014 | Watkins, Jr. |
| 8,997,792 B2 | | 4/2015 | Betsinger et al. |
| 2001/0018845 A1 | | 9/2001 | Roberts |
| 2002/0154029 A1 | | 10/2002 | Watters et al. |
| 2003/0164048 A1 | | 9/2003 | Shkel |
| 2004/0065377 A1 | | 4/2004 | Whiteley |
| 2005/0253821 A1 | | 11/2005 | Roeder |
| 2007/0051166 A1 | | 3/2007 | Baker et al. |
| 2007/0131035 A1 | | 6/2007 | Krutz et al. |
| 2008/0036617 A1 | | 2/2008 | Arms et al. |
| 2010/0308575 A1 | * | 12/2010 | Rodenburg ............. F16L 33/01 285/256 |
| 2011/0152024 A1 | | 6/2011 | Kuehl |
| 2011/0226302 A1 | | 9/2011 | Farmer et al. |
| 2011/0281488 A1 | | 11/2011 | Li |
| 2012/0136592 A1 | * | 5/2012 | Pereira .................. F16L 11/086 702/50 |
| 2012/0204923 A1 | | 8/2012 | Ortiz et al. |
| 2012/0278018 A1 | | 11/2012 | Hastreiter |
| 2013/0134992 A1 | | 5/2013 | Zhu et al. |
| 2014/0076449 A1 | | 3/2014 | Betsinger et al. |
| 2014/0238109 A1 | | 8/2014 | Wells et al. |
| 2015/0177172 A1 | | 6/2015 | Upasani et al. |
| 2015/0240972 A1 | | 8/2015 | Betsinger |
| 2015/0300538 A1 | | 10/2015 | Al-Atat et al. |

FOREIGN PATENT DOCUMENTS

| | | |
|---|---|---|
| EP | 1 126 205 A1 | 8/2001 |
| EP | 1 722 217 A1 | 11/2006 |
| EP | 2 261 546 A1 | 12/2010 |
| GB | 1574749 A | 9/1980 |
| JP | 2011027216 A | 2/2011 |
| WO | WO 03/079749 A2 | 10/2003 |
| WO | WO 2008/001238 A2 | 1/2008 |
| WO | WO 2008/059226 A2 | 5/2008 |
| WO | 2011143384 A1 | 11/2011 |
| WO | WO 2012/012482 A1 | 1/2012 |
| WO | WO 2012/071424 A2 | 5/2012 |
| WO | WO 2012/149161 A1 | 11/2012 |

OTHER PUBLICATIONS

International Search Report and Written Opinion for Application No. PCT/US2012/035216 mailed Jul. 16, 2012.
International Search Report and Written Opinion for Application No. PCT/US2014/017590 mailed Jun. 3, 2014.
International Search Report for Application No. PCT/IN2012/000296 mailed Nov. 27, 2012.
International Search Report for Application No. PCT/US2013/030966 mailed Aug. 1, 2013.
Invitation to Pay Additional Fees with Partial International Search for Application No. PCT/US2013/048660 mailed Mar. 24, 2014.
International Search Report and Written Opinion for Application No. PCT/US2013/048660 mailed Sep. 8, 2014.
International Search Report for Application No. PCT/U52013/059465 mailed Dec. 3, 2013.
Invitation to Pay Additional Fees with Partial International Search for Application No. PCT/US2013/059473 mailed Feb. 28, 2014.
International Search Report and Written Opinion for Application No. PCT/US2013/059473 mailed Jul. 18, 2014.
Holland, Z. et al., "Layered Polymer Whole Structure Health Monitoring Using Capacitance Sensing", *IEEE/ASME International Conference on Advanced Intelligent Mechatronics*, Montreal, Canada, Jul. 6-9, 2010, pp. 943-946.
Hewlett Packard Technical Manual, printed Apr. 24, 2003, 8 Pages.
Guo, Z. et al., "GRE: Graded Residual Energy Based Lifetime Prolonging Algorithm for Pipeline Monitoring Sensor", *9th International Conference on Parallel and Distributed Computing Applications and Technologies*, 203-210 (2008).
Mohamed, M. et al., "Power Harvesting for Smart Sensor Networks in Monitoring Water Distribution System", *International Conference on Networking, Sensing and Control*, 393-398 (2011).
Ok, C. et al., "Optimal Transmission Power in Self-sustainable Sensor Networks for Pipeline Monitoring", *IEEE International Conference on Automation Science and Engineering*, 591-596 (2007).
Radtke, I. et al., "Design of Power-Transmitting Hydraulic Hose with Integrated Controller Area Network and Life-Sensing Capability," *2005 Agricultural Technology Conference Sponsored by ASAE*, 1 page (2005).
European Search Report for Application No. 12875245.8 mailed Dec. 15, 2015.

* cited by examiner

US 9,643,550 B2

HOSE VOLTAGE CARRIER

BACKGROUND

The present application claims priority from U.S. Provisional Patent Application No. 61/793,246, filed on Mar. 15, 2013, the disclosure of which is hereby incorporated by reference in its entirety.

BACKGROUND

The present disclosure relates generally to delivery of voltage to remote devices. In particular, the present disclosure relates to a hose voltage carrier.

BACKGROUND

High pressure reinforced hydraulic hose is typically used on a variety of fluid power operated machines, such as earth-moving machines, to provide a flexible connection between several moving parts of a hydraulic circuit employed on or within the machine. Such hoses may include a hollow polymeric inner tube on which successive cylindrical layers of reinforcing material, such as wire or textile, are concentrically applied to contain the radial and axial pressures developed within the inner tube.

Such hydraulic hoses can be used to connect between various control valves in a hydraulic system. These control valves are often dispersed throughout the overall hydraulic system, for example of the fluid power operated machine, or other types of applications. Control valves are electronically actuated to control their opening/closing operations, typically from a control panel associated with the hydraulic system. Wiring is therefore routed throughout the hydraulic system of a machine to control valve actuations. This can include to very remote portions of a machine, such as at the end of a boom where a hydraulic control valve may be placed.

In connection with use of hydraulic hoses, increasingly applications are demanding hose constructions with both high burst strength and long term fatigue resistance. Using conventional technology, the burst strength of a hose design may be increased by adding additional reinforcing material and/or layers, a practice which is generally discouraged because of its negative impact on the flexibility of the hose, or by universally increasing the tensile strength of each layer of reinforcement material, which may come at the expense of hose fatigue resistance.

In some circumstances, it is desirable to detect, in a non-destructive and non-disruptive manner a likelihood of failure of a hydraulic hose. One solution providing this capability is discussed in U.S. Pat. No. 7,555,936, and discloses connecting a monitor circuit between two parallel, at least partially-conductive layers of a hose wall. A change in an electrical property observed by that monitor circuit may indicate a change in a property of the hose wall structure that might indicate impending failure of the hose wall.

The focus of using such hydraulic hoses has been related to detection of failures of the hose itself. However, other problems exist in overall hydraulic systems that may use such hoses. For example, the routing of control lines to each control valve provides additional complexity and cost to an overall system design, as well as extra assembly time and a potential for the wire to be damaged during use.

For these and other reasons, improvements are desirable.

SUMMARY

In accordance with the present disclosure, the above and other issues are addressed by the following:

In a first aspect, a method of delivering a voltage signal to remote equipment associated with a hydraulic system is disclosed. One method includes actuating an output voltage from a control panel at an electronic control output electrically connected at a socket positioned on a first end of a hose assembly, the hose assembly having a conductive layer electrically connected to the socket and extending the length of the hose assembly and also electrically connected to a second socket at a second end of the hose assembly. By actuating the output voltage, the output voltage is delivered to remote equipment at the second end of the hose assembly that is electrically connected to the second socket.

In a second aspect, a system includes a control panel configured to produce an output voltage for actuating remote equipment, and a hose assembly including a hose having first and second ends. The first end has a first fitting including a nipple and socket, the second end has a second fitting including a nipple and socket, and the hose includes a conductive layer electrically connected to the socket of the first fitting and the socket of the second fitting. The system further includes an electrical connection between the control panel and the socket of the first fitting, the electrical connection passing the output voltage through the hose assembly to the socket of the second fitting for use by the remote equipment.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

As briefly described above, embodiments of the present disclosure are directed to a hose voltage carrier, in which a hose assembly can be used in place of an electrical cable to transmit a voltage signal to a remote location. The hose voltage carrier of the present disclosure can be provided, for example, for use in connection with a hydraulic circuit or control system, such as may be present in a fluid-driven machine. In particular, embodiments of the present disclosure, the hose voltage carrier allows a voltage signal to propagate along a hose without being conveyed to (and therefore shorting at or electrifying) a piece of equipment connected at an end of the hydraulic hose.

Figure 1:
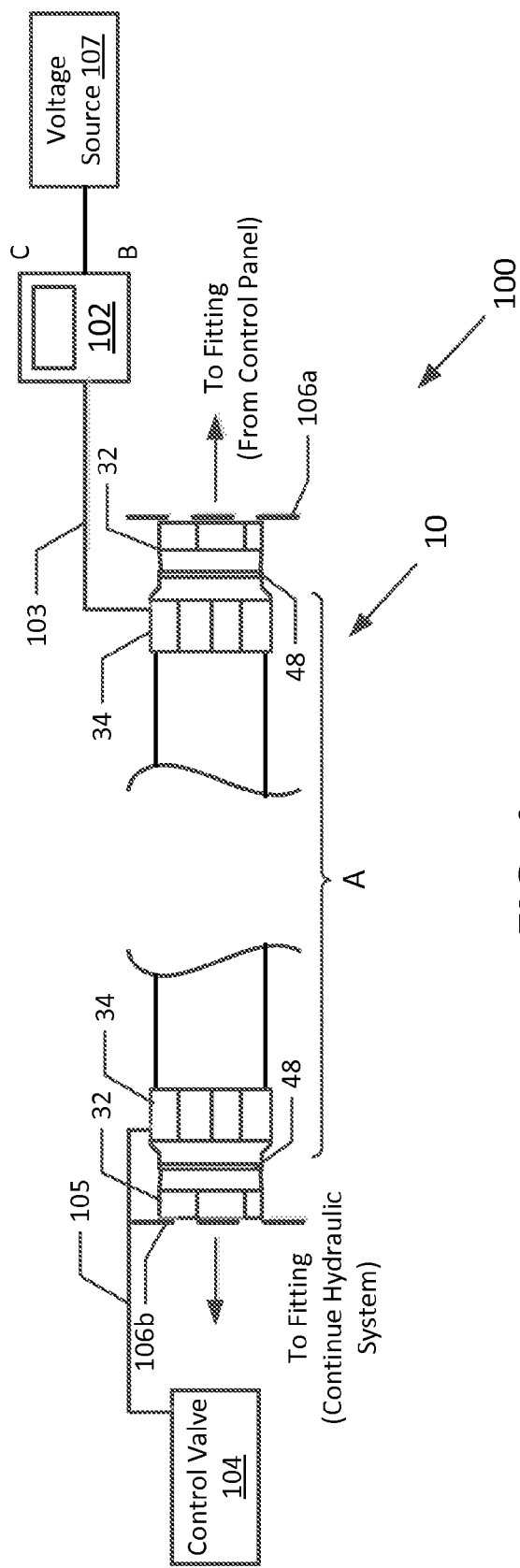
FIG. 1 illustrates a system for delivering a voltage signal to remote equipment, according to an example embodiment.

Referring now to FIG. 1, a system 100 for delivering a voltage signal to remote equipment is shown. In the embodiment shown, the system 100 includes a hose voltage carrier arrangement 10 electrically connected between a control system 102 and remote equipment, shown as control valve 104. The hose voltage carrier arrangement 10 is discussed in further detail in connection with FIGS. 2-4; generally it includes a hose having a length "A", and at each end a nipple 32 and socket 34 are provided. As discussed in further detail in connection with FIGS. 2-4, the nipple and socket 34 at each end are electrically insulated from one another, and the sockets 34 are electrically interconnected by a conductive reinforcement layer of the hose included in the hose voltage carrier arrangement 10.

The control panel 102 can generate a voltage signal to be delivered on an electrical connection 103 to the hose voltage carrier arrangement 10. Since the sockets 34 are electrically interconnected, the voltage can be provided to remote equipment, such as control valve 104, via electrical connection 105. In alternative embodiments, other types of electrical equipment could be included as the remote equipment, such as other types of valves or control panels within the overall system 100.

The hose voltage carrier arrangement 10 can be connected, for example as part of a hydraulic system, to endpoints, such as hydraulic equipment, that may have conductive surfaces 16a-b. However, as further discussed below, because the electrical connections 103, 105 are made to the sockets 34 at the first and second ends of the hose voltage carrier arrangement 10 (which are electrically insulated from the associated nipples 32 by insulator 48, as noted below), no electrical connection is made to the surfaces 106a-b, while concurrently no wire is required to traverse along distance A. In other words, due to the insulation between the nipple 32 and socket 34 at each end of the a hose voltage carrier arrangement 100, application of a voltage from the control panel 102 does not energize a wall of the components to which the hose is interconnected, thereby avoiding delivery of electrical shock to individuals touching equipment that includes surfaces 106a-b. As such, wiring of the hydraulic system, and the machine in which it is included, is simplified.

In the embodiment shown a voltage source 107 is connected to the control panel 102, and either the voltage source 107 or control panel can provide various amounts of voltage or various types of voltage signals along the hose voltage carrier arrangement 10. For example, in some embodiments the voltage source 107 can deliver a 12-24 volt signal to the control panel, which can deliver a selected voltage level along the hose voltage carrier arrangement 10, depending upon the desired received voltage at the remote equipment (e.g., about 3-10 V). In alternative embodiments, the voltage source 107 is itself programmable to deliver a desired voltage level.

In use, it is also noted that the control panel 102 and/or voltage source can be configured to provide a voltage signal to the remote equipment of various types. In some embodiments, a continuous voltage signal is provided, for example to power remote equipment. In alternative embodiments, a limited-duration voltage signal can be provided, for example to power and/or provide a control input signifying to remote equipment to take some action (e.g., in the case of a control valve 104, to actuate between open and closed positions, or some other operation).

It is noted that in some embodiments, an enclosure can be placed around the socket 34 and associated exposed portions of electrical connections 103, 105, to prevent electrical shock and protect against environmental conditions causing degradation of the electrical connection (e.g., via corrosion or other causes). It is noted that example enclosures useable to protect a hose voltage carrier arrangement 10 are disclosed in U.S. Provisional Patent Application No. 61/701, 307, filed on Sep. 14, 2012, and entitled "Wave Contact Arrangement for Hose Assembly," the disclosure of which is hereby incorporated by reference in its entirety.

Figure 2:
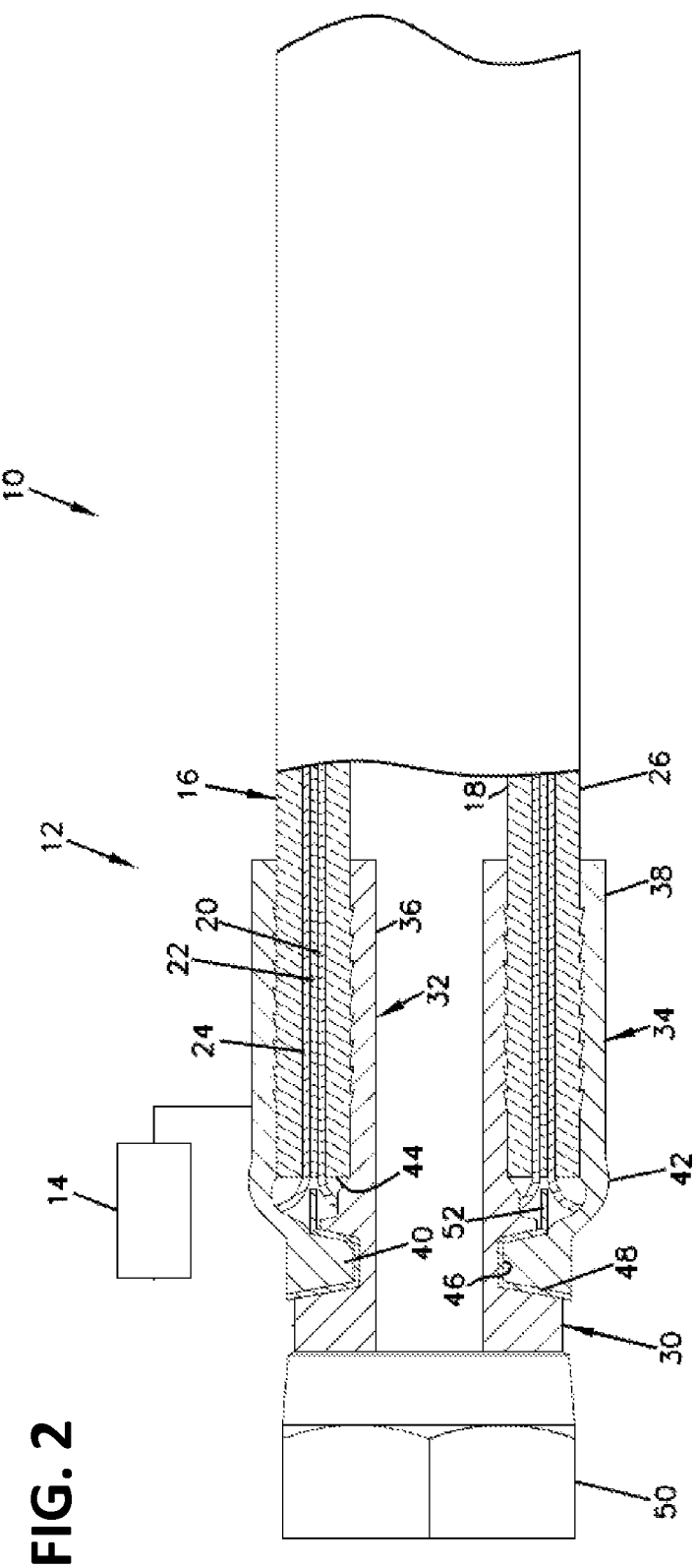
FIG. 2 is a partial cross-sectional view of an exemplary hose assembly employing a fault detector having exemplary features of aspects in accordance with the principles of the present disclosure.

Referring now to FIG. 2, an exemplary hose voltage carrier arrangement 10 is shown in which such a hose voltage carrier arrangement can be implemented. The hose voltage carrier arrangement 10 includes a hose assembly, generally designated 12, and remote equipment 14 in electrical and physical communication with the hose assembly 12.

The hose assembly 12 includes a hose, generally designated 16, having a multi-layer construction. In the subject embodiment, the hose 16 is generally flexible and includes an inner tube 18 made from a polymeric material, such as rubber or plastic, or another material depending on the requirements of the particular application, a first conductive layer 20, an intermediate layer 22, a second conductive layer 24 and an outer cover 26. The first and second conductive layers 20, 24 define an electrical characteristic of the hose assembly 12, such as capacitance, inductance and/or resistance (impedance).

In the subject embodiment, the first conductive layer 20 overlays the inner tube 18 and the intermediate layer 22 overlays the first conductive layer 20. The second conductive layer 24 overlays the intermediate layer 22. The first and second conductive layers 20, 24 may be configured as reinforcing layers. The outer cover 26 may overlay the second conductive layer 24, and may include, for example, an extruded layer of rubber or plastic. The outer cover 26 may itself include a reinforcing layer.

The intermediate layer 22 operates to at least partially insulate electrically the first and second conductive layers 20, 24 from one another. The intermediate layer 22 may have any of a variety of constructions. For example, the intermediate layer 22 may consist of a single layer of an electrically resistive material. The intermediate layer 22 may also consist of multiple layers, wherein at least one of the layers exhibits electrical insulating properties. Certain composite materials may also be employed in the intermediate layer 22, such as a woven fabric bonded to a polymeric material. Composite materials having various other constructions may also be utilized. Composite materials may also be used in combination with other materials to form the intermediate layer 22.

The first and second conductive layers 20, 24 generally extend the entire length and span the entire circumference of the hose. This is generally the case when the conductive layer also functions as a reinforcement layer. The intermediate layer 22 may also extend over the entire length and circumference of the hose. There may be instances, however, where at least one of the first and second conductive layers 20, 24 extends only over a portion of the hose length and/or a portion of its circumference. In that instance, the intermediate layer 22 may also be configured to generally extend over the region of the hose containing the partial conductive layer 20, 24. The partial intermediate layer 22 may be positioned within the hose so as to separate the first and second conductive layers 20, 24 from one another.

Figure 3:
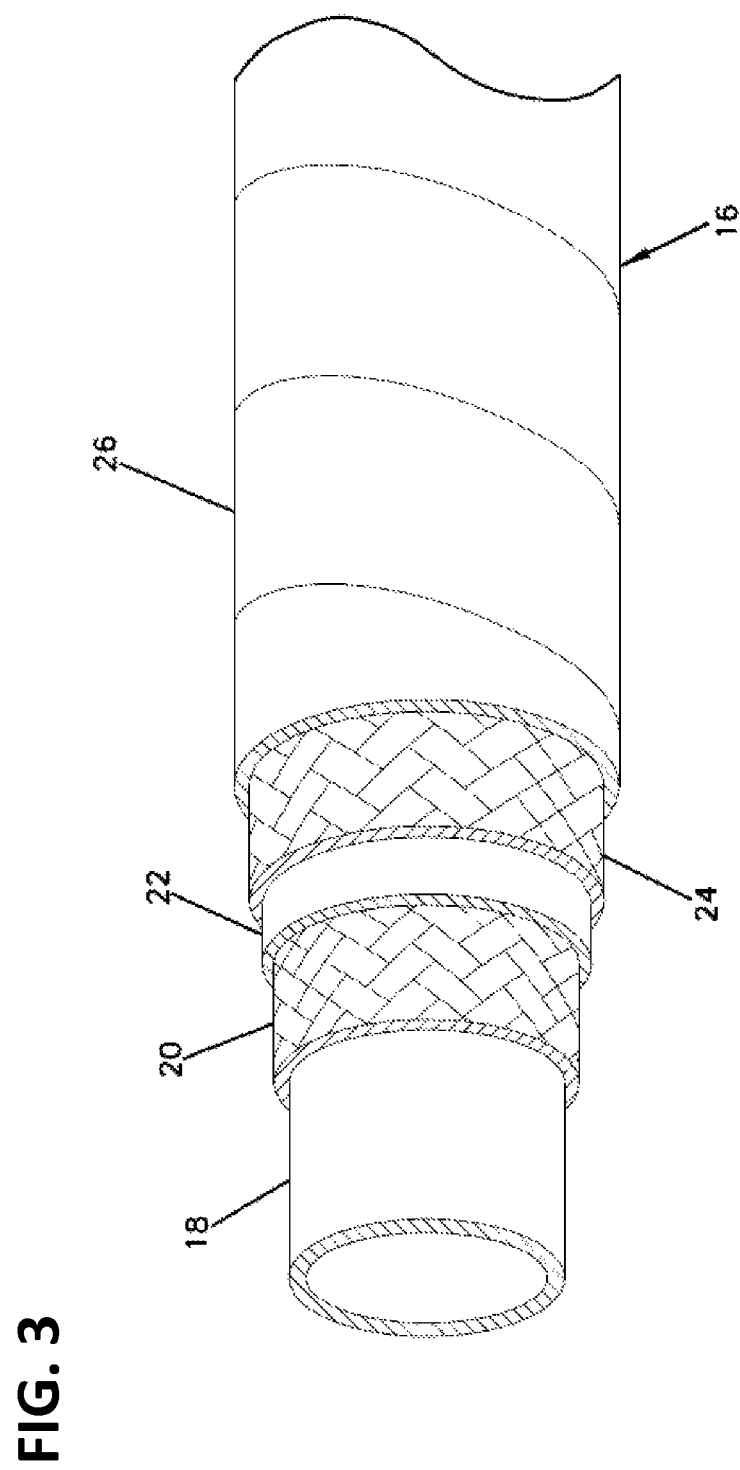
FIG. 3 is a perspective view, partially cut away, illustrating an exemplary hose employing a braided conductive layer that is suitable for use with the hose assembly of FIG. 2.
Figure 4:
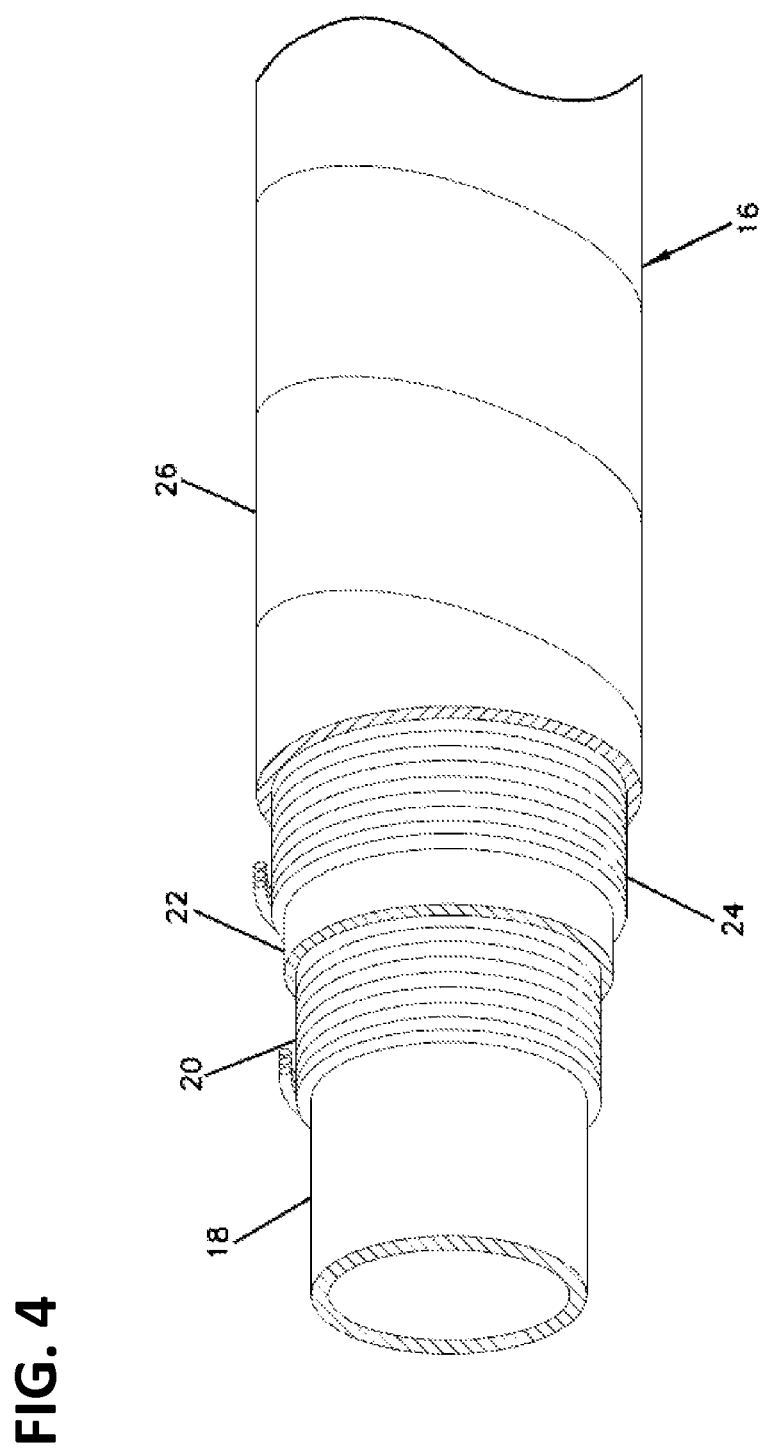
FIG. 4 is a perspective view, partially cut away, illustrating an exemplary hose employing a spiral wire conducting layer that is suitable for use with the hose assembly of FIG. 2.

Referring now to FIGS. 2 and 3, the first and second conductive layers 20, 24 may include, for example, an electrically conductive braided reinforcement material, such as shown in FIG. 2, or alternating layers of electrically conductive spiral reinforcement material, such as shown in FIG. 3. The braided reinforcement material may consist of a single layer or may include multiple layers. Although a two-wire spiral reinforcement arrangement is depicted in FIG. 3, it shall also be appreciated that other configurations, such as four and six wire arrangements, may also be utilized.

The first and second conductive layers 20, 24 may each have the same configuration, or each layer may be configured differently. For example, the first and second conductive layers 20, 24 may each include the braided material shown in FIG. 2, or one of the first and second conductive layers 20, 24 may include the braided material while the other of the first and second conductive layers 20, 24 may include the spiral reinforcement material shown in FIG. 3. Additionally, the first and second conductive layers 20, 24 may include a single ply or multiple plies of reinforcement material. The first and second conductive layers 20, 24 may comprise metal wire, natural or synthetic fibers and textiles, and other reinforcement materials, provided the selected material is electrically conductive. In general, when the hose assembly 12 is stressed, the layers 20, 24 can come into contact, either when a layer 22 completely degrades or in an instantaneous case where the layers momentarily connect.

Referring again to FIG. 1, the hose assembly 12 may include a hose fitting, generally designated 30, for fluidly coupling the hose 16 to another component. The hose fitting 30 may have any of a variety of different configurations depending, at least in part, on the requirements of the particular application.

In the subject embodiment, the hose fitting 30 includes a nipple, generally designated 32, that engages the inside of the hose 16 and a socket, generally designated 34, that engages the outside of the hose 16. The nipple 32 includes an elongated cylindrical end portion 36 that engages the inner tube 18 of the hose 16. A cylindrically shaped end portion 38 of the socket 34 engages the outer cover of the hose 16. The socket 34 and nipple 32 may be constructed from an electrically conductive material.

The socket 34 and nipple 32 can be secured to the hose 16 by crimping the end portion 38 of the socket 34 overlaying the hose 16. The crimping process deforms the end portion 38 of the socket 34, thereby compressing the hose 16 between the nipple 32 and the socket 34. In the subject embodiment, the portions of the nipple 32 and the socket 34 that engage the hose 16 include a series of serrations that at least partially embed into the relatively softer hose material when the socket 34 is crimped to help secure the hose fitting 30 to the hose 16. The serrations may be configured to prevent the serrations from penetrating the inner tube and outer cover and contacting the first and second conductive layers 20, 24.

In the subject embodiment, the socket 34 includes an inwardly extending circumferential lug 40 positioned near an end 42 of the socket 34 adjacent an end 44 of the hose 16. The lug 40 engages a corresponding circumferential slot 46 formed in the nipple 32 for securing the socket 34 to the nipple 32. The end 42 of the socket 34 having the lug 40 is initially formed larger than the nipple 32 to enable the socket 34 to be assembled onto the nipple 32. During the assembly process the end 42 of the socket 34 is crimped, which deforms the socket 34 and forces the lug 40 into engagement with the corresponding slot 46 in the nipple 32. The socket 34 can be electrically insulated from the nipple 32 by positioning an electrically insulating collar 48 between the socket 34 and nipple 32 at the point the lug 40 engages the slot 46.

The hose fitting 30 also includes a nut 50 rotatably attached to the nipple 32. The nut 50 provides a means for securing the hose assembly 12 to another component. In general, when the hose fitting is attached to a complementary fitting, the nipple 32 will contact a mating portion of the complementary hose fitting, and the nut 50 will secure the hose assembly 12 to another component. It is noted that, based on the collar 48, separator 52, and insulating layer 22, although sockets 34 at opposing ends of a hose assembly 12 can be electrically connected by conductive layer 24, no portion of that conductive layer will, in normal operation (without attendant hose failure) contact an inner conductive layer 20 or the nipple 32 of the hose assembly 12).

In the embodiment shown, the first conductive layer 20 may be configured to extend beyond the end of the inner tube of the hose 16. The first conductive layer 20 may engage the nipple 32 to create an electrical connection between the nipple 32 and the first conductive layer 20. Similarly, the second conductive layer 24 may be configured to extend beyond an end of the outer cover of the hose 16. The second conductive layer 24 may engage the socket 34 to create an electrical connection between the socket 34 and the second conductive layer 24.

To help prevent the portions of the first and second conductive layers 20, 24 that extend beyond the end of the hose 16 from contacting one another, an electrically insulating spacer 52 may be positioned between the exposed ends of the first and second conductive layers 20, 24. The spacer 52 may be integrally formed as part of the collar 48 used to electrically insulate the socket 34 from the nipple 32. The spacer 52 may also be formed by extending the intermediate layer 22 of the hose 16 beyond an end of the inner tube 18 and outer cover 26. The spacer 52 may also be configured as a standalone component separate from the collar 48 and the intermediate layer 22 of the hose 16.

The remote equipment 14 may have any of a variety of configurations, and take a variety of forms. For example, in some embodiments, the remote equipment can be an electrically actuated control portion of the hydraulic system of a machine, such as a control valve as illustrated in FIG. 1. Other types of require equipment could be used as well, such as monitoring systems, control systems, or other types of valves, or electromechanical equipment. In the embodiment shown, because the remote equipment 14 is connected only to the socket 34 and not the nipple 32, (e.g., based on use of the electrically insulating collar 48 and spacer 52), electrical connection between the voltage signal on conductive layer 24 and the nipple 32 is avoided.

It is noted that the hose assembly 12 as discussed herein has a number of additional applications beyond delivery of signals, such as voltage signals, to a remote location. For example, degradation monitoring features are also provided across layers 20, 24, to allow a circuit to monitor for changes in electrical characteristics of the hose assembly 12, to determine when or if the hose assembly is about to fail. Example discussion of such a solution is provided in U.S. patent application Ser. No. 13/458,691, filed on Apr. 27, 2012, and entitled "Degradation Monitoring System for Hose Assembly", which is incorporated by reference herein in its entirety, and U.S. Provisional Patent Application No. 61/701,325, entitled "Sense and Hold Circuit for Hose Assembly", and filed on Sep. 14, 2012, the disclosure of which is also incorporated by reference herein in its entirety. However, it is noted that, since these systems, as well as delivery of the voltage signal along layer 24 may not need to be transmitted at all times (in fact, it is likely that such signals are relatively sparse relative to the amount of time they are required to occur), such systems may be coordinated and both implemented across the same hose assembly 12.

In alternative embodiments, for example where such degradation monitoring is not present, only a single conductive layer electrically connected between sockets 34 might be incorporated into the hose assembly 12.

Figure 5:
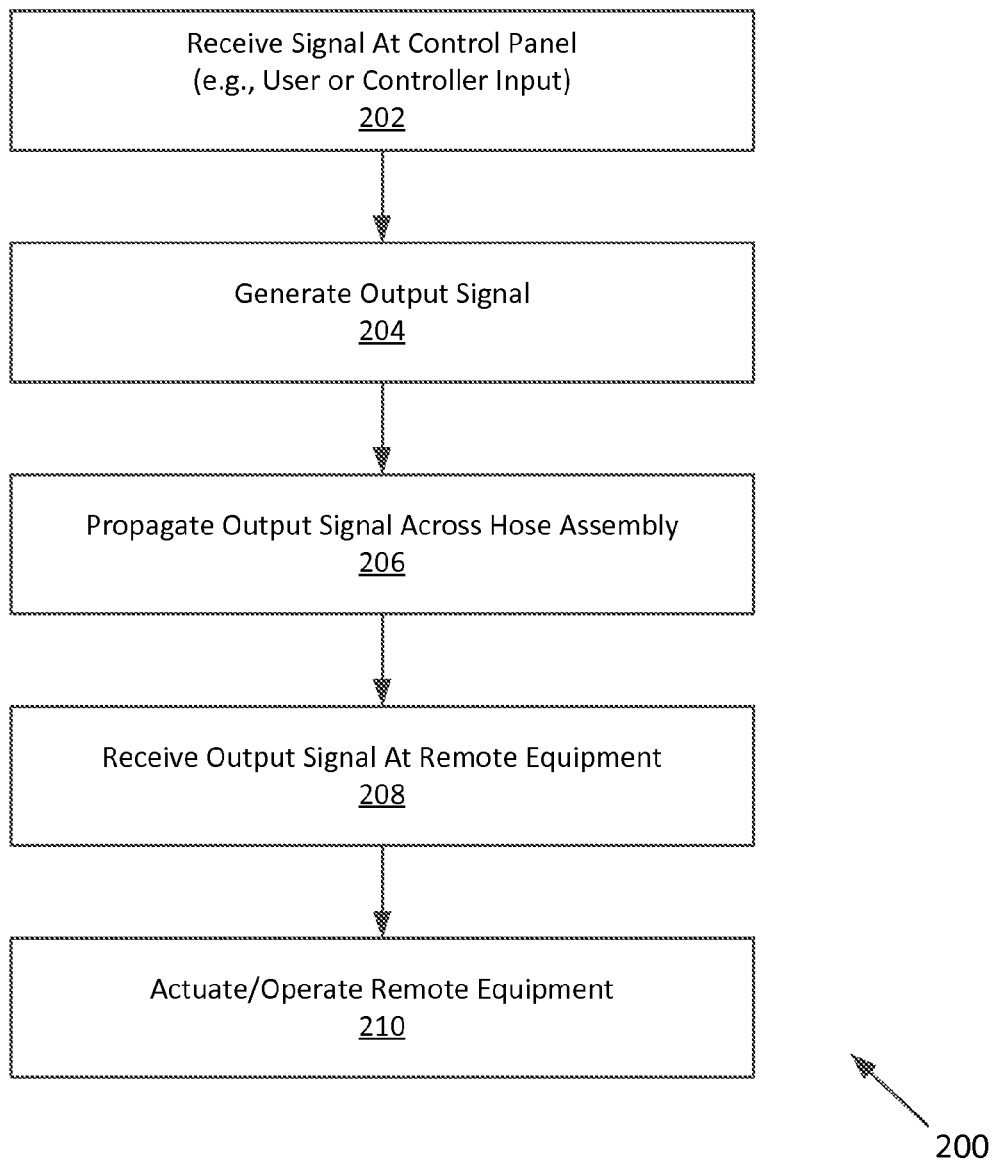
FIG. 5 is a flowchart of a method of operation of the system of FIG. 1.

Referring now to FIG. 5, an example method 200 of delivering a voltage signal to remote equipment associated with a hydraulic system is disclosed. The method 200 can be performed, for example, using the hose assembly 12 of FIGS. 2-4, for example within the system 100 shown in FIG. 1. It is noted that, although discussed in the context of the system 100 of FIG. 1, the method 200 can be used in other system configurations as well.

In the embodiment shown, the method 200 includes receiving a signal at a control panel 102 (step 202). This can include, for example receiving a user input at a control panel 102, a controller input from a remote system, or simply receiving a voltage signal at the control panel, such as from voltage source 107 of FIG. 1. The method 200 further includes generating an output signal in response to that received signal (step 204). The output signal can include a voltage signal at a predetermine voltage level (e.g., based on the requirements of the remote equipment designated to receive the voltage signal), and for either a continuous amount of time or for a limited duration, predetermined amount of time.

The method 200 also includes propagating that output signal along the hose assembly, and in particular by way of electrical connections to sockets 34 at first and second ends of the hose assembly (step 206). By applying the voltage at a first end, the voltage can be provided to the far end socket 34 by way of at least one conductive layer of the hose assembly, such as layer 24. The output signal is then received at remote equipment electrically connected to the far end socket (step 208), and that remote equipment can actuate or operate based on the received signal (step 210).

Referring to FIGS. 1-5 overall, it is noted that the systems and methods of the present disclosure provide a number of advantages over traditional separate routing of electrical and hydraulic signals, in that complexity of wiring routing is greatly reduced. Furthermore, because testing of the hose assemblies is typically required for use with a degradation monitor solution, the conductive layer 24 used to deliver a voltage signal will provide a reliable connection for signal delivery.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of delivering power to remote equipment associated with a hydraulic system, the method comprising:
actuating an output voltage from a control panel at an electronic control output electrically connected at a socket positioned on a first end of a hose assembly, the hose assembly having a plurality of concentric conductive layers including a first conductive layer and a second conductive layer, the first conductive layer being electrically connected to the socket and extending the length of the hose assembly and also electrically connected to a second socket at a second end of the hose assembly, thereby delivering the output voltage to remote equipment at the second end of the hose assembly that is electrically connected to the second socket, the second conductive layer useable in combination with the first electrical layer to monitor degradation of the hose assembly in coordination with delivering the output voltage to remote equipment at the second end of the hose assembly.

2. The method of claim 1, wherein the remote equipment comprises a control valve connected at the second end of the hose assembly.

3. The method of claim 1, further comprising receiving an activation signal at the control panel.

4. The method of claim 3, wherein receiving the activation signal comprises receiving a user input activating the hydraulic control valve.

5. The method of claim 3, wherein receiving the activation signal comprises receiving a controller input from a remote system.

6. The method of claim 1, further comprising receiving the output voltage at the remote equipment.

7. The method of claim 1, further comprising actuating the remote equipment in response to the output voltage.

8. The method of claim 1, wherein actuating the output voltage includes transmitting the output voltage for a predetermined amount of time.

9. A system comprising:
a control panel configured to produce an output voltage for actuating remote equipment;
a hose assembly including a hose having first and second ends, the first end having a first fitting including a nipple and socket, the second end having a second fitting including a nipple and socket, the hose including a plurality of concentric conductive layers including a first conductive layer electrically connected to the socket of the first fitting and the socket of the second fitting and a second conductive layer useable in combination with the first conductive layer to monitor degradation of the hose assembly in coordination with delivering the output voltage to remote equipment at the second end of the hose assembly;
an electrical connection between the control panel and the socket of the first fitting, the electrical connection passing the output voltage through the hose assembly to the socket of the second fitting for use by the remote equipment.

10. The system of claim 9, wherein the remote equipment is electrically connected to the socket of the second fitting.

11. The system of claim 9, wherein the hose assembly is installed within a hydraulic system.

12. The system of claim 11, wherein the remote equipment comprises a control valve.

13. The system of claim 12, wherein the output voltage actuates the control valve.

14. The system of claim 9, wherein the sockets of the first and second fittings are electrically separated from the nipples of the first and second fittings by an insulating layer.

15. The system of claim 9, wherein the output voltage comprises a voltage in the range of 12-24 V.

16. The system of claim 9, wherein the output voltage comprises a voltage in the range of 3-10 V.

17. The system of claim 9, wherein the remote equipment forms a portion of a hydraulic circuit in which the hose assembly is connected, and wherein the hose assembly is fluidically connected to the remote equipment at the nipple of the second end.

18. The system of claim 9, wherein the control panel comprises a hydraulic control system of a hydraulically-operated machine.

* * * * *